(12) United States Patent
Kolb

(10) Patent No.: US 8,678,508 B2
(45) Date of Patent: Mar. 25, 2014

(54) HORIZONTAL SPRINGING MEANS WITH INCLINATION COMPENSATION

(75) Inventor: Jens Kolb, Koenigstein (DE)

(73) Assignee: Grammer AG (DE)

( * ) Notice: Subject to any disclaimer, the term of this patent is extended or adjusted under 35 U.S.C. 154(b) by 218 days.

(21) Appl. No.: 13/195,603

(22) Filed: Aug. 1, 2011

(65) Prior Publication Data

US 2012/0025577 A1 Feb. 2, 2012

(30) Foreign Application Priority Data

Aug. 2, 2010 (DE) .......................... 10 2010 033 028

(51) Int. Cl.
*B60N 2/44* (2006.01)

(52) U.S. Cl.
USPC ............... 297/463.2; 297/344.11; 297/344.13

(58) Field of Classification Search
USPC .............................. 297/344.11, 344.13, 463.2
See application file for complete search history.

(56) References Cited

U.S. PATENT DOCUMENTS

| | | | |
|---|---|---|---|
| 203,739 A | 5/1878 | Kilburn | |
| 1,544,248 A | 6/1925 | Liebl | |
| 1,607,164 A | 11/1926 | Leipert et al. | |
| 1,945,801 A | 2/1934 | Briggs | |
| 1,948,476 A | 2/1934 | Saurer | |
| 2,489,981 A | 3/1946 | Rose | |
| 2,559,105 A | 7/1951 | Banning, Jr. | |
| 2,607,397 A * | 8/1952 | Schneider | 267/112 |
| 2,686,667 A | 8/1954 | Willison et al. | |
| 3,046,053 A * | 7/1962 | Pearlstine | 297/344.11 |
| 3,134,568 A * | 5/1964 | Carson | 248/425 |
| 3,208,085 A | 9/1965 | Grimshaw | |
| 3,298,654 A | 1/1967 | Dome | |
| 3,436,042 A | 4/1969 | Van Goubergen | |
| 3,608,855 A | 9/1971 | Osenberg | |
| 3,756,556 A | 9/1973 | Georgi | |
| 3,788,697 A | 1/1974 | Barton et al. | |
| 3,847,338 A | 11/1974 | Adams | |
| 3,882,956 A | 5/1975 | Plegat | |
| 4,002,315 A | 1/1977 | Van Goubergen | |

(Continued)

FOREIGN PATENT DOCUMENTS

| | | |
|---|---|---|
| DE | 1480465 | 1/1970 |
| DE | 1405350 | 3/1970 |

(Continued)

OTHER PUBLICATIONS

Official Action for corresponding German Patent Application No. 102010033028.0, dated Nov. 29, 2011, 5 pages.

(Continued)

*Primary Examiner* — Philip Gabler
(74) *Attorney, Agent, or Firm* — Sheridan Ross P.C.

(57) ABSTRACT

The invention relates to a vehicle vibration apparatus with a horizontal spring device for the horizontal springing of a seat element and/or a driver's cab with respect to a base element, wherein the horizontal spring device is arranged between the seat element or the driver's cab respectively and the base element, and comprises at least one spring element, the longitudinal axis of which extends substantially parallel to a surface of the base element, and at least one adjustment element, which reacts automatically to inclinations of the seat element with respect to a horizontal plane and which first increases the spring pre-stressing of the spring element in order subsequently to position the horizontal spring device in the centre of the spring path.

12 Claims, 3 Drawing Sheets

(56) References Cited

U.S. PATENT DOCUMENTS

| | | | |
|---|---|---|---|
| 4,022,411 A | 5/1977 | Rumsey | |
| 4,183,492 A | 1/1980 | Meiller | |
| 4,273,213 A | 6/1981 | Munz | |
| 4,500,076 A | 2/1985 | Rova | |
| 4,519,591 A | 5/1985 | Bush et al. | |
| 4,529,158 A | 7/1985 | Sautter, Jr. | |
| 4,678,155 A | 7/1987 | Carter | |
| 4,679,760 A * | 7/1987 | Dotzler et al. | 248/602 |
| 4,714,227 A | 12/1987 | Holm et al. | |
| 4,842,257 A | 6/1989 | Abu-Isa et al. | |
| 4,859,148 A | 8/1989 | Hibyan | |
| 4,927,119 A | 5/1990 | Frost | |
| 4,954,051 A | 9/1990 | Smith et al. | |
| 4,958,812 A | 9/1990 | Wolf et al. | |
| 5,004,206 A | 4/1991 | Anderson | |
| 5,014,960 A * | 5/1991 | Kimura | 248/602 |
| 5,054,753 A | 10/1991 | Polus | |
| 5,087,503 A | 2/1992 | Meatto | |
| 5,194,111 A | 3/1993 | Meatto | |
| 5,331,750 A | 7/1994 | Sasaki et al. | |
| 5,358,210 A | 10/1994 | Simon et al. | |
| 5,368,118 A | 11/1994 | Hoefle | |
| 5,437,494 A | 8/1995 | Beauvais | |
| 5,449,218 A | 9/1995 | Beauvais et al. | |
| 5,553,911 A | 9/1996 | Bodin et al. | |
| 5,555,501 A | 9/1996 | Furihata et al. | |
| 5,632,208 A | 5/1997 | Weber | |
| 5,651,585 A | 7/1997 | Van Duser | |
| 5,871,257 A * | 2/1999 | Dundes, Sr. | 297/314 |
| 5,899,288 A | 5/1999 | Schubert et al. | |
| 6,286,821 B1 | 9/2001 | Schaffer | |
| 6,478,102 B1 | 11/2002 | Puterbaugh et al. | |
| 6,725,983 B2 | 4/2004 | Bell | |
| 6,758,294 B2 | 7/2004 | Peddycord et al. | |
| 6,773,049 B2 | 8/2004 | Rupiper et al. | |
| 6,857,674 B2 | 2/2005 | Chareyre | |
| 7,017,888 B2 | 3/2006 | Platner et al. | |
| 7,044,553 B2 * | 5/2006 | Ropp | 297/344.15 |
| 7,077,226 B2 | 7/2006 | Oliver et al. | |
| 7,077,227 B2 | 7/2006 | Oliver et al. | |
| 7,201,367 B2 | 4/2007 | Wietharn | |
| 7,240,754 B2 | 7/2007 | Barta et al. | |
| 7,300,100 B2 | 11/2007 | McLean et al. | |
| 7,331,627 B2 | 2/2008 | Van Den Brink et al. | |
| 7,338,126 B2 * | 3/2008 | Ropp | 297/344.15 |
| 7,452,019 B1 * | 11/2008 | Day | 296/65.16 |
| 7,478,879 B2 | 1/2009 | Robinson | |
| 7,744,149 B2 | 6/2010 | Murray et al. | |
| 7,882,914 B2 | 2/2011 | Scheele et al. | |
| 7,950,726 B2 | 5/2011 | Brown | |
| 7,997,600 B2 | 8/2011 | Haller et al. | |
| 8,095,268 B2 | 1/2012 | Parison et al. | |
| 8,182,038 B2 | 5/2012 | Haller | |
| 8,186,475 B2 | 5/2012 | Sugden et al. | |
| 8,225,903 B2 | 7/2012 | Dunn | |
| 8,261,869 B2 | 9/2012 | Turco et al. | |
| 8,265,832 B2 | 9/2012 | Haller et al. | |
| 2005/0051373 A1 | 3/2005 | Bernhardt et al. | |
| 2005/0224269 A1 | 10/2005 | Dahl | |
| 2006/0061022 A1 | 3/2006 | Chang et al. | |
| 2006/0208401 A1 | 9/2006 | Reast | |
| 2006/0237885 A1 | 10/2006 | Paillard et al. | |
| 2009/0045000 A1 | 2/2009 | Brown | |
| 2009/0205880 A1 | 8/2009 | Hammonds | |
| 2009/0284061 A1 | 11/2009 | Maier et al. | |
| 2010/0006364 A1 | 1/2010 | Koutsky et al. | |
| 2010/0213345 A1 | 8/2010 | Haller | |
| 2010/0276211 A1 | 11/2010 | Kolb et al. | |
| 2010/0289312 A1 | 11/2010 | Burr et al. | |
| 2012/0007293 A1 | 1/2012 | Bauer et al. | |
| 2012/0032379 A1 | 2/2012 | Kolb | |
| 2012/0043798 A1 | 2/2012 | Haller et al. | |
| 2012/0049602 A1 | 3/2012 | Kaessner | |
| 2012/0133184 A1 | 5/2012 | Himmelhuber | |
| 2012/0145875 A1 | 6/2012 | Haller et al. | |
| 2012/0153551 A1 | 6/2012 | Kolb | |
| 2013/0069409 A1 | 3/2013 | Kolb | |

FOREIGN PATENT DOCUMENTS

| | | |
|---|---|---|
| DE | 1480188 | 3/1970 |
| DE | 2309808 | 9/1973 |
| DE | 2317824 | 10/1973 |
| DE | 7419891 | 10/1974 |
| DE | 2537174 | 8/1975 |
| DE | 7731339 | 1/1978 |
| DE | 2816616 | 10/1979 |
| DE | 141769 | 5/1980 |
| DE | 3208680 | 3/1982 |
| DE | 3517345 | 11/1986 |
| DE | 3890533 | 10/1989 |
| DE | 3901898 | 7/1990 |
| DE | 9312640 | 1/1994 |
| DE | 19907658 | 2/1999 |
| DE | 19744199 | 4/1999 |
| DE | 19945841 | 4/2001 |
| DE | 10129127 | 1/2003 |
| DE | 10206223 | 9/2003 |
| DE | 10300876 | 7/2004 |
| DE | 102005028725 | 1/2005 |
| DE | 102005023088 | 6/2006 |
| DE | 102006030008 | 4/2007 |
| DE | 102008063812 | 4/2007 |
| DE | 112006002984 | 10/2008 |
| DE | 102008023120 | 5/2010 |
| EP | 0284365 | 9/1988 |
| EP | 1400398 | 3/2004 |
| EP | 1577156 | 9/2005 |
| EP | 1652724 | 5/2006 |
| FR | 2352686 | 12/1977 |
| GB | 1401881 | 8/1975 |
| GB | 1432614 | 4/1976 |
| GB | 1587637 | 4/1981 |
| GB | 2438090 | 11/2007 |
| WO | WO 92/04224 | 3/1992 |
| WO | WO 98/32627 | 7/1998 |
| WO | WO 03/063650 | 8/2003 |
| WO | WO 2007/058572 | 5/2007 |

OTHER PUBLICATIONS

Extended European Search Report for European Patent Application No. 11175774.6, dated Dec. 14, 2011, 5 pages.

* cited by examiner

HORIZONTAL SPRINGING MEANS WITH INCLINATION COMPENSATION

CROSS REFERENCE TO RELATED APPLICATIONS

This application claims the benefit of German Application No. 10 2010 033 028.0filed Aug. 2, 2010, the entire disclosure of which is hereby incorporated by reference.

The present invention relates to a vehicle vibration apparatus with a horizontal spring device for the horizontal springing of a seat element and/or a driver's cab with respect to a base element according to the preamble of claim 1.

In the course of its use each vehicle is operated not only on a horizontally orientated roadway but in some cases also has to overcome enormous inclines or drops in the terrain and also small irregularities of the roadway, as can occur for example in the case of potholes.

In this case the driver of the vehicle, as well as also a possible co-driver or passenger, is subjected to not inconsiderable jolts and changes in the position and direction in the vehicle, which have to be compensated by a seat, in particular a passenger seat or a driver's cab respectively, in order to ensure the sitting comfort for the passenger even in the case of an uneven roadway.

In particular, vibrations and jolts transversely to the direction of travel can be damped by a transverse or lateral horizontal springing means in order to protect the back from unhealthy shaking, whereas vibrations during rapid travel or in very hilly terrain can be minimized by a longitudinal horizontal springing means.

In particular, buffer and springing systems for damping jolts at a right angle to the roadway are known sufficiently from the prior art, in which case, however, the horizontal forces in the longitudinal and/or trans-verse direction, which occur and which press a passenger against the backrest of the vehicle seat for example when climbing a hill or when accelerating the vehicle or push him or her in the direction of the steering wheel for example when descending a hill or during a braking procedure, are not taken into consideration.

A horizontal spring device in vehicle seats is described for example in DE 35 17 345 C2, in which a helical tension spring is tensioned vertically in the longitudinal direction of the spring between the seat area and the base area of a vehicle seat and by means of a two-part element, which is arranged on this helical tension spring on both sides in the horizontal direction between the two stationary ends of the helical tension spring, i.e. between one end which is fastened to the seat area and the other end which is fastened to the base area of the vehicle seat. This two-part element is connected by way of a connecting element to the support of the seat plate of the vehicle seat and when the seat is deflected it is acted upon in such a way that the element is pressed in the horizontal direction against the stressed coils of the helical tension spring, i.e. at a right angle to the longitudinal direction of the spring extension. Accordingly, the helical tension spring is subjected to increased transverse loading/stress, in which case this spring device can spring only in a single horizontal direction in order to act for example as a longitudinal or as a transverse horizontal springing means.

In addition, a horizontal springing means is described in DE 102 06 223 B4, which comprises however two spring elements which are arranged on the scissor arms of the scissor frame or on the regions of the seat element in such a way that when the seat is deflected on account of the acceleration or deceleration speeds the individual spring elements are stressed to pressure or to tension, so that the seat element is movable in a horizontally springing manner in the longitudinal direction with respect to the base element. A compensation of lateral jolts by means of a transverse horizontal springing means for example cannot be carried out by this horizontal springing variation.

Consequently, the object of the present invention is to make available a vehicle vibration apparatus with a horizontal spring device for a seat element or for a driver's cab respectively, for example for a utility vehicle, a tractor or a fork-lift truck, which is inexpensive to produce, needs a small space requirement, operates efficiently and, at the same time, can be produced in a simple manner mechanically, in which case a longitudinal horizontal springing means, as well as a transverse horizontal springing means, is implemented.

This object is attained by the present invention by means of a vehicle vibration apparatus with a horizontal spring device for the horizontal springing of a seat element and/or a driver's cab with respect to a base element, in which case the horizontal spring device is arranged between the seat element or the driver's cab respectively and the base element, and comprises at least one spring element, the longitudinal axis of which extends substantially parallel to a surface of the base element, and at least one adjustment element which reacts automatically to inclinations of the seat element with respect to a horizontal plane and which first increases the spring pre-stressing of the spring element in order subsequently to position the horizontal spring device in the centre of the spring path.

The vehicle vibration apparatus according to the invention is consequently preferably used to compensate the longitudinal and/or transverse forces by means of a longitudinal and transverse horizontal spring device which is arranged in or on a driver's cab or even in or on a passenger seat in order to make available a vehicle seat or a driver's cab respectively—which provides virtually the springing comfort of a car seat—in a utility vehicle, a tractor, a dredger etc.

Consequently, jolts and changes in the position and direction, which act upon the passenger during the travel of the vehicle on account of irregularities in the terrain or inclines or drops of the roadway, are compensated by seats or driver's cabs with a vehicle vibration apparatus according to the invention arranged or integrated and with a horizontal springing means. As a result, the passenger is protected from unhealthy effects for example upon his or her back on account of vibrations and jolts longitudinally as well as transversely to the direction of travel, as the deflections of the seat are minimized and are substantially steadily reduced in such a way that an adequate spring path is available at all times for the springing of the seat.

In addition, it is possible—by means of the vehicle vibration apparatus according to the invention with a horizontal springing means which is arranged in or on a vehicle seat or a driver's cab respectively—to meet the EU Guideline 2002/44/EWG which states inter alia that the health of employees has to be protected from being put at risk by physical effects, as a result of which it is also necessary for the maximum daily acceptable exposure to vibrations to which an employee is subjected to be regulated.

The correction of the deflection of the seat is made possible, in which case instead of a seat a complete driver's cab can also be mounted in a horizontally sprung manner, by means of at least one spring element which is preferably a spiral spring, as well as an automatically reacting adjustment element.

The automatically reacting adjustment element, which reacts automatically to any deflection of the seat from its position of equilibrium or inclination of the seat with respect to a horizontal plane in such a way that the spring element is acted upon with an additional force which acts upon the spring element substantially in the longitudinal direction of the extension of the spring, can be either an automatically acting element or an electronic or electrically actuated element.

As a result, in addition to or instead of the mechanical components which are arranged directly on the spring element, the adjustment element can have components which for example receive signals of a movement of the seat element with respect to a base element in order to produce a directed movement of the adjustment element. These components are for example sensors, simple displacement transducers or actuators.

In this case the base element is a base area of the seat or the driver's cab respectively with which the seat or the driver's cab respectively is arranged and preferably fastened on the vehicle or on the surface of the vehicle floor in the interior of a vehicle. The base area can be the lowest plane of the seat or the seat frame or the seat base as viewed in the vertical direction and in a starting position in which the seat has not yet been deflected or inclined it is orientated substantially parallel to the area of the seat. The base element can likewise comprise rails or guides which are arranged on the surface of the vehicle floor and in which the vehicle seat is mounted at least for a time so as to be displaceable in the direction of the longitudinal direction of the vehicle or the direction of travel, in order for example to be able to set the distance of the seat from the steering wheel in a variable manner.

In a preferred embodiment the automatically reacting adjustment element is a pendulum and thus an automatically acting element which reacts automatically to the different movements of the seat without actuation of an additional element. The pendulum preferably has a pendulum mass and, in addition, a pendulum arm and is connected by the end thereof opposite the pendulum mass for example to an end of the spring element or the spring elements, it also being possible for the pendulum to be arranged on any desired coil of the spring element. If the pendulum has a pendulum arm then this spaces the pendulum mass at a distance from the end at which the pendulum is arranged on the spring element, the pendulum arm forming a straight line in its longitudinal orientation, as a result of which the pendulum is orientated at a right angle to the longitudinal axis of the spring at least in a starting position.

In this case a starting position is understood to be a position in which the seat undergoes no deflection from its centre of gravity or centre point orientated with respect to the seat frame and no inclination with respect to the horizontal plane. In the starting position the at least one spring element has at least for a time substantially no spring constant which represents the degree of the tensile or pressing force of a spring, so as not to influence the natural frequency behaviour of the spring element at least for a time.

Furthermore the pendulum is preferably mounted so as to be rotatable in a fulcrum on an arrangement element or preferably on a support element, so that at least in sections the pendulum mass and, when a pendulum arm is present, also at least portions of the pendulum arm can oscillate freely about the fulcrum at least locally.

The pendulum mass and also the pendulum arm which consequently spaces the pendulum mass at a distance from the fulcrum and essential produces a lever arm, oscillate in the region of the seat frame about the fulcrum, in which case the oscillation curve is limited on both sides in each case only by the contact of the pendulum mass or the pendulum arm respectively with the at least one spring element.

If the fulcrum, i.e. the point in which the pendulum is mounted so as to be rotatable on or in the support element or on or in the arrangement element, is connected to the centre point of the mass of the pendulum weight or the pendulum mass by a line with each other, then a straight line is produced which has the tendency always to orientate itself at a right angle to the horizontal plane, and this corresponds to an orientation of the pendulum or the pendulum mass with respect to the centre point of the Earth since the pendulum weight is attracted at least for a time on account of the Earth's gravitational force. As a result, the pendulum mass is always orientated in such a way on account of the Earth's gravitational force that the straight line described above is orientated at a right angle to the horizontal plane, but in the event of an inclination of the seat or the driver's cab respectively with respect to the horizontal plane it is not necessarily orientated at a right angle to the base element.

In this case the expression "the horizontal plane" is to be understood as meaning the mathematical horizon which a cutting line of the celestial sphere forms with a plane which at the place of observation is at a right angle to the perpendicular direction. In this way, inclinations or even drops of the terrain are planes which do not correspond to the horizontal plane or are not orientated parallel to the horizontal plane, but are orientated at an angle to the horizontal plane depending upon the degree of the drop or the inclination.

The inclination is preferably also referred to as a gradient and is a measure of the steepness of a straight line or a curve and thus represents the region of the terrain which a vehicle travels upwards, for example when driving up a hill.

The drop itself is the negative value of the inclination and thus represents for example the region of the terrain which a vehicle travels downwards, such as for example when driving down a hill.

An orientation of the pendulum weight at a right angle to the horizontal plane leads, when an inclination of the seat or the driver's cab respectively occurs with respect to the horizontal plane, to a deflection of the spring elements arranged on the pendulum. Meanwhile the spring elements, which are arranged for example in or on an arrangement element in such a way that at least one end of each spring element is connected to the arrangement element in a substantially fixed manner whilst the other end is connected to the pendulum in a fixed manner, follow the movement of the arrangement element which corresponds to the movement of the seat element in such a way that they are stretched or compressed accordingly in the longitudinal direction of the extension of the spring.

A deflection or inclination of the seat takes place on account of an acceleration or deceleration of the movement of the vehicle as well as well as on account of an incline or a drop or on account of irregularities in the terrain. As a result, the seat is moved out of its starting position, as a result of which the spring elements are likewise moved in the direction in which the seat element is deflected. This takes place on account of the arrangement of the spring elements in or on the arrangement element which is arranged parallel to the seat area of the seat element and is connected to the latter in a fixed manner, as a result of which the spring elements are likewise (indirectly) connected to the seat element.

In contrast to this the automatically reacting adjustment element, which in this embodiment is a pendulum, is connected in its fulcrum to the support element, in which case the support element is arranged in a fixed manner on the foot of the seat which in turn is connected in a fixed manner to the floor of the vehicle. In this way, the support element and consequently the fulcrum of the pendulum are not moved out of their starting position in the event of a deflection or inclination of the seat.

Consequently the end of the pendulum which is connected to one end of the spring element remains essentially in its starting position, in which case the other end of the spring element which is fastened to the arrangement element follows the deflection of the arrangement element.

The spring elements which are thus acted upon with tensile or pressing force are additionally acted upon with tensile or pressing force in the case where the pendulum is orientated at a right angle to the horizontal plane, so that an equilibrium of forces is again present in the middle of the spring path.

An orientation of the pendulum at a right angle to the horizontal line is necessary if the pendulum is deflected for a short time out of its position of equilibrium on account of the suddenly occurring inclination of the drop.

If the seat element or the driver's cab respectively is in a position orientated horizontally, i.e. the seat or the driver's cab respectively is not inclined with respect to the horizontal plane, the spring element is not stressed, so that virtually no spring constant is required.

The arrangement element is an element on or in which the spring element is arranged, in which case a plurality of spring elements can also be arranged in series or even parallel to one another. One end of the spring element which is not connected to the automatically reacting adjustment element is fastened to the arrangement element, so that it is made possible for a corresponding force to be able to be exerted by the pendulum upon the spring.

The spring elements are preferably spiral springs and, in a further preferred manner, cylindrical helical springs which can be acted upon both with tension and with pressure with respect to their longitudinal spring axis. It is also possible, however, for other types of springs to be used which will not be completely explicitly listed here.

The arrangement element, in or on which the spring element is arranged, is mounted by way of at least two bearings, preferably loose bearings on a support element, in which case the support element can constitute for example the upper region of a scissor frame in which the scissor arms are arranged so as to be movable in a rotational and/or translational manner. Consequently the arrangement element and the support element are arranged at a distance parallel to each other.

On account of the use of loose bearings the arrangement element is mounted in a movable manner over two degrees of freedom in two directions parallel to the base element, i.e. in the longitudinal direction to the direction of travel and in the transverse direction orientated thereto. In this way, the arrangement element can be displaced with respect to the support element in the direction of travel, for example if the vehicle travels downhill in the case of a drop or even if it brakes on a level roadway, whereas the support element is connected in a fixed manner to a base element by way of a scissor frame for example and undergoes no change in position with respect to the base element.

The same applies in the case of an acceleration procedure of the vehicle or if the vehicle travels uphill, as a result of which the arrangement element is displaced together with the seat element and the backrest with respect to the support element in a direction opposed to the direction of travel.

The procedure of a spring movement for the springing of the driver's cab or the seat respectively is described below with reference to the example of a longitudinal horizontal springing means. As a result of this horizontal springing means the changes in the position of the seat in the event of an inclination of the seat with respect to the horizontal plane for example in the case of travelling down a drop or in the case of inclines or in the case of an acceleration or deceleration procedure should preferably be compensated in such a way that a suitably desired springing of the seat is further possible in the case of the deflections of the seat which are applied subsequently. This explanation can apply in the same way, however, to the procedure in the case of a transverse horizontal springing means when the vehicle is inclined transversely to the direction of travel, in which case the driver's cab or the seat respectively is inclined transversely to the direction of travel with respect to a horizontal plane.

If the vehicle is moved downhill for example on account of a drop in the terrain or is subjected to a braking procedure respectively, the first spring element which can be pre-stressed by means of the adjustment element and is arranged on the first side of the adjustment element which faces in the direction of travel is acted upon with tensile force on account of the down-slope force or the centrifugal force respectively, since the arrangement element is displaced in the direction of travel in this case. In a corresponding manner, the first spring element fastening point in which the first spring element is fastened to the arrangement element is also displaced at the same time in the direction of travel, whereas the adjustment element fastening point in which the first spring element is fastened to the adjustment element preferably remains in the starting position for the moment. In this way, the distance between the first spring element fastening point of the first spring element and the adjustment element fastening point is increased, as a result of which the first spring element is stretched. At the same time the second spring element, which can likewise be pre-stressed by means of the adjustment element and is arranged on the second side of the adjustment element opposite the first side, is acted upon with pressing force since the movement of the arrangement element in the direction of travel also signifies a movement of a second spring element fastening point—in which the second spring element is fastened to the arrangement element—in the direction of travel. In the meantime the adjustment element fastening point—in which the second spring element is fastened to the adjustment element—preferably remains in the starting position for the moment. In this way, the distance between the second spring element fastening point and the adjustment element fastening point is decreased, as a result of which the second spring element is compressed.

As a result of this movement of the arrangement element and accordingly the spring element fastening points for example in the direction of travel, the centre of the spring path of the horizontal spring device is displaced, as a result of which a movement closer to the ends of the spring path takes place. As a result, the first spring element is stretched in such a way and the second spring element is compressed in such a way that almost no residual spring path remains any longer. Consequently it is necessary to move the horizontal spring device back into the centre of the spring path in order to ensure an adequate spring path.

In order to achieve this, the automatic adjustment element is adapted to the inclination of the seat or the driver's cab respectively with respect to the horizontal plane, by applying an increased counter force to the down-slope force or the centrifugal force respectively, in order to return the spring element or the horizontal spring device respectively back into the centre of the spring path. As a result, an active slope adjustment takes place, as a result of which a soft spring characteristic line can be produced when a pendulum, an air spring or another actuator is used as an automatically reacting adjustment element.

When a pendulum is used as the automatically reacting adjustment element the pendulum mass is continuously attracted by the Earth's gravitational force, in which case the pendulum or the pendulum mass is orientated towards the horizontal plane—even if possibly slightly offset in time with respect to the inclination of the seat element—in such a way that the straight line which connects the fulcrum of the pendulum and the centre point of the pendulum mass to each other is always orientated at a right angle to the horizontal plane.

Even after a brief deflection of the pendulum on account of an acceleration or braking procedure of the vehicle the pendulum always seeks to return to its position of equilibrium, as a result of which the pendulum mass is always orientated in such a way that the straight line which is formed when the centre point of the pendulum mass is connected to the fulcrum of the pendulum is always orientated at a right angle to the horizontal plane.

In a further embodiment the automatically reacting adjustment element can be or can have a shaft with an eccentric, an electronic regulating unit, an air spring or even an actuator.

As a result, elements capable of being regulated electronically are arranged on the arrangement element, the seat element or even the support element in such a way that they detect an inclination of the seat element or the driver's cab respectively with respect to the horizontal plane and cause a corresponding movement of the spring elements in order to position the horizontal spring device in the centre of the spring path.

In a further embodiment it is possible for the automatically reacting adjustment element to be arranged on an inertial gear mechanism or even on a rotation-damping means or to have an inertial gear mechanism or even a rotation-damping means. As a result it is possible for the adjustment element to react with a delay to the inclination of the seat element with respect to the horizontal plane in order to be able to engage in a suitably regulating and controlling manner only with a continuing inclination or increased deflection of the seat or the driver's cab respectively with respect to the horizontal plane, in order to move the spring elements in such a way that the horizontal spring device is moved back into the centre of the spring path.

As well as the horizontal spring device further elements, such as for example a longitudinal spring device for springing and/or a damping means for damping can be arranged on the seat element or on or in the driver's cab respectively.

In this case a gas spring which is arranged for example on a scissor arm of a scissor frame can preferably be used as the longitudinal spring device.

The scissor frame constitutes a preferred seat foot by which the seat element or the driver's cab respectively is arranged at a distance from a base element, in which case the seat element or the driver's cab respectively is vertically adjustable with respect to the base element by means of this scissor frame.

Some end regions of the individual scissor arms of the scissor frame can be mounted so as to be movable in a rotational and/or translational manner on the base element which is connected in a fixed manner to the vehicle or to the vehicle floor respectively and has no momentum, whereas the other end regions of the scissor arms are arranged so as to be movable in a rotational and/or translational manner on the support element for example. In addition, it is possible for the scissor arms to pass through each other or to be arranged so as to be rotatable on each other in a defined region. The different embodiments of a scissor frame for a seat are known sufficiently from the generally known prior art and can constitute a component part of this seat with the vehicle vibration apparatus according to the invention with the horizontal springing means.

Further advantages, aims and properties of the present invention are explained with reference to the following description of the accompanying drawing in which preferred embodiments of the vehicle vibration apparatus according to the invention with a horizontal springing apparatus as well as a seat with a vehicle vibration apparatus according to the invention with a horizontal springing apparatus are illustrated in a horizontal and inclined position by way of example. In the figures FIG. 1a is an schematic drawing of a first embodiment of the vehicle vibration apparatus according to the invention with a horizontal springing apparatus in a position level with the horizontal plane;

Figure 1A:
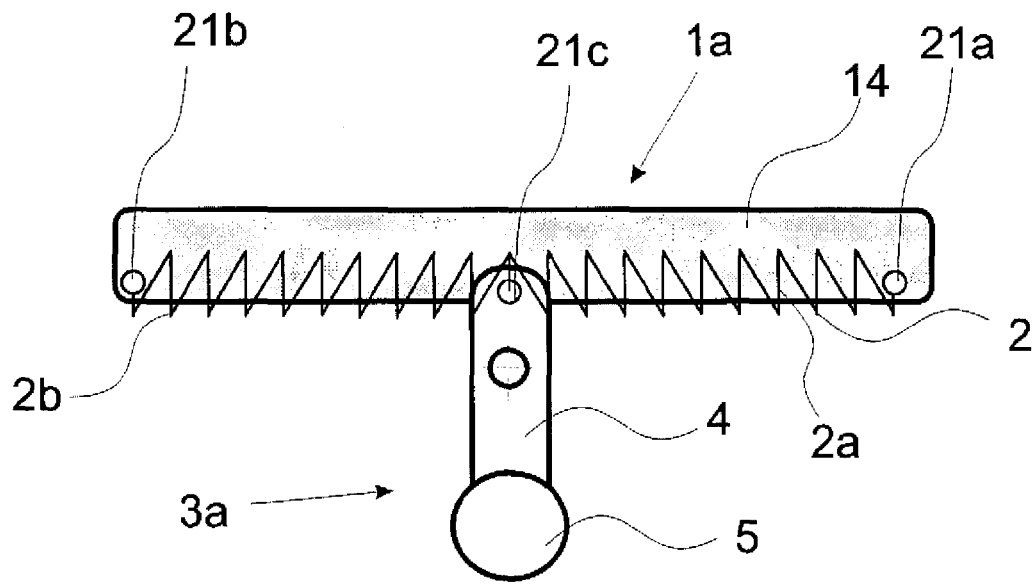
FIG. 1b is an schematic drawing of a second embodiment of the vehicle vibration apparatus according to the invention with a horizontal springing apparatus in a position level with the horizontal plane.

FIG. 1a is an schematic drawing of a first embodiment of a vehicle vibration apparatus according to the invention with a horizontal springing apparatus 1a which is in a horizontal starting position, in which case at least one spring element 2 is arranged in or on an arrangement element 14, in which case also at least two spring elements 2a, 2b can be arranged in series with or even parallel to each other in or on the arrangement element 14. These spring elements are preferably spiral springs and in a further preferred manner cylindrical spiral springs. If the two spiral springs 2a, 2b are arranged in series in or on the arrangement element 14, then the first spiral spring 2a is connected at one end in a first spring element fastening point 21a to the arrangement element 14, whereas the second spiral spring 2b is connected at one end in a second spring element fastening point 21b to the arrangement element 14. Consequently the two ends of the spiral springs 2a, 2b, which are arranged at the greatest distance from each other, are connected in the corresponding spring element fastening points 21a, 21b to the arrangement element 14, whereas the other ends of the spiral springs 2a, 2b, which are arranged not far from each other or can even touch each other, are connected to a pendulum 3a in an adjustment element fastening point 21c. It is also possible for the pendulum 3a to be arranged only in the centre of the longitudinal spring axis, and therefore on a coil of the spiral spring on only one spiral spring 2 fastened in or to the arrangement element 14 and consequently subdivides the spiral spring 2 into two areas of equal length with substantially identical spring constants. The pendulum 3a, which in this embodiment is the automatically reacting adjustment element, has a pendulum arm 4 and a pendulum mass 5.

Figure 1B:
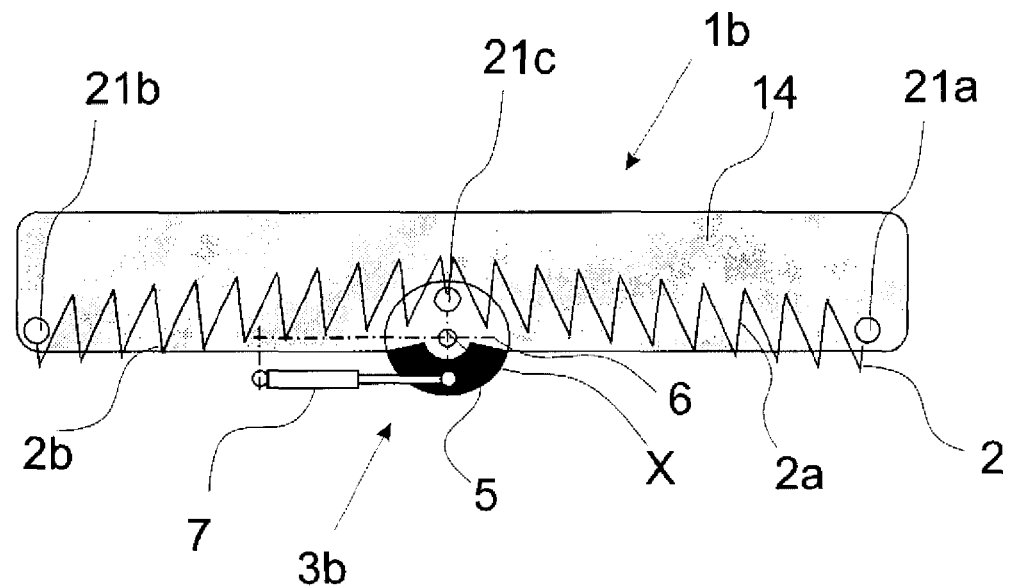

FIG. 1b is an schematic drawing of a second embodiment of a vehicle vibration apparatus according to the invention with a horizontal springing apparatus 1b which is in a horizontal starting position, in which case the design and the arrangement of the spiral springs 2, 2a, 2b with respect to one another and with respect to the arrangement element and the pendulum correspond to the design and the arrangement of the spiral springs 2, 2a, 2b as shown in FIG. 1a. The pendulum 6 is mounted on the arrangement element 14 so as to be rotatable in a fulcrum X, in which case the pendulum 6 is braked by way of a rotation-damping means 7 which is mounted at one of its ends on the pendulum mass 5 and at the other of its ends on the support element 14 for example, in order to prevent a change in the spring pre-stressing on account of a rapid stimulation for example on account of a brief braking or acceleration procedure.

Figure 2:
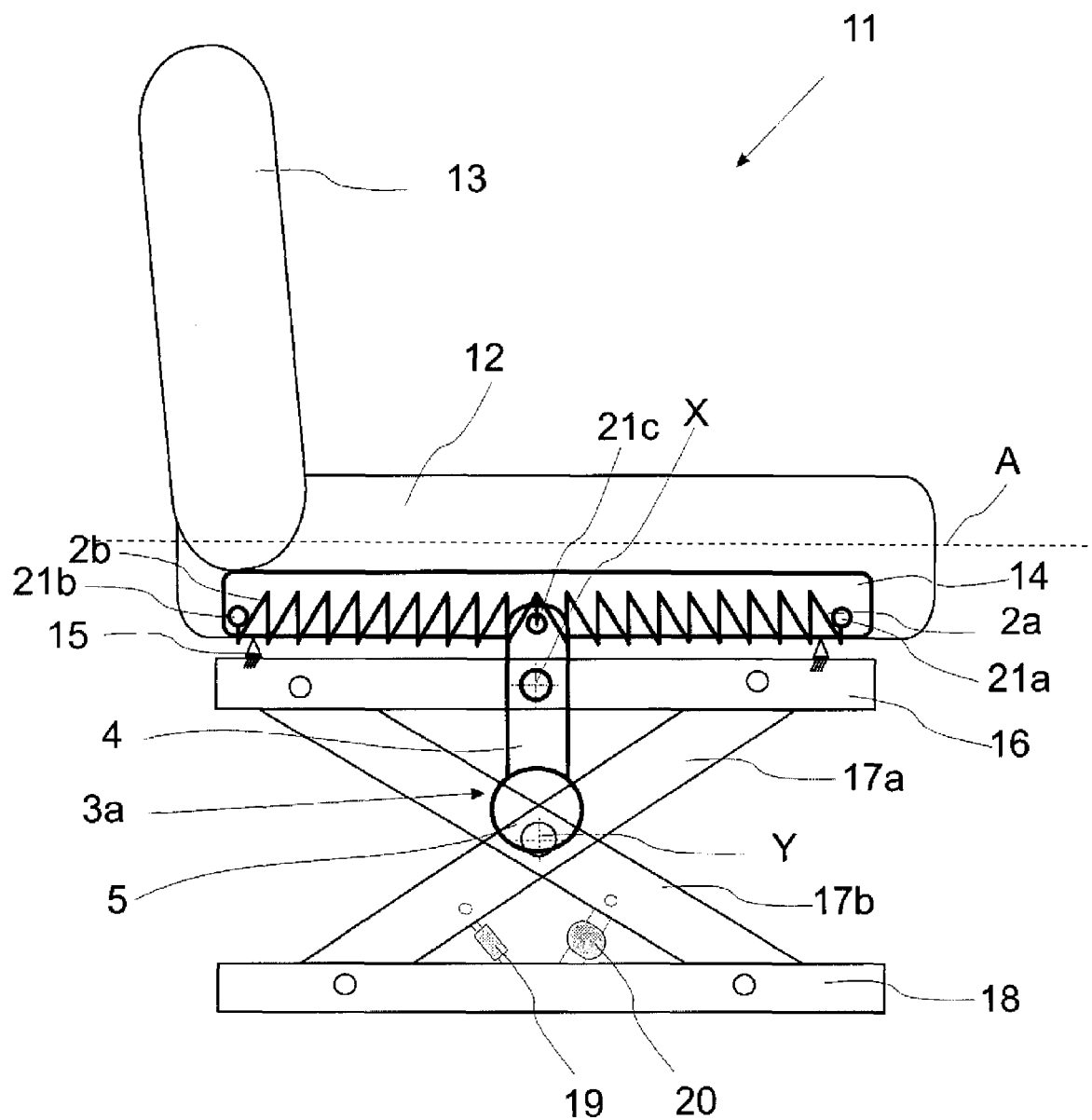
FIG. 2 is an schematic drawing of a seat with—arranged on it—a first embodiment of the vehicle vibration apparatus according to the invention with a horizontal springing apparatus as shown in FIG. 1a and with a scissor frame in a position level with the horizontal plane.

FIG. 2 is an schematic drawing of a seat 11 with—arranged on it—a first embodiment of the vehicle vibration apparatus according to the invention with a horizontal springing apparatus 1a as shown in FIG. 1a and with a scissor frame which has at least two scissor arms 17a, 17b, in which case the entire seat 11 is in a horizontal position, i.e. not inclined with respect to the horizontal plane A. In addition to the seat element 12, the seat 11 also has a backrest 13 which is connected to the seat element 12 in a rotatable or adjustable manner. Furthermore the horizontal spring device 1a is arranged with the arrangement element 14 on the lower surface of the seat element 12 or inside the seat element 12, in which case two spiral springs 2a, 2b arranged in series are arranged in or on the arrangement element 14 and are connected in each case with their ends which are spaced at the greatest distance from each other to the arrangement element 14 in the spring element fastening points 21a, 21b and with the ends which rest against each other to a pendulum 6 in the adjustment element fastening point 21c. These spiral springs 2, 2a, 2b present in the horizontal starting position predominantly have a soft spring characteristic line or in the case of a progressive design of the spiral springs a low spring constant. The height-adjustable scissor frame of the seat 11 has two scissor arms 17a and 17b which are arranged at one end in the base element 18 and at the other end in the support element 16 so as to be movable in a rotational and/or translational manner and intersect at a fulcrum Y, so that the support element 16 is height-adjustable with respect to the base element 18. The arrangement element 14 is arranged on the support element 16 so as to be movable by means of loose bearings 15 and it can be displaced with respect to the support element 16 both in the longitudinal direction and in the trans-verse direction to the direction of travel. The pendulum 3a, which has a pendulum arm 4 and a pendulum mass 5, is mounted in a rotatable manner on the support element in the fulcrum X, so that the pendulum mass 5 can oscillate freely about the fulcrum X. Furthermore, the end of the pendulum opposite the pendulum mass is connected to the two spiral springs 2a, 2b in the adjustment element fastening point 21c, in order to be able to act upon the spiral springs 2a, 2b in the event of a deflection or inclination of the seat 11 with respect to the horizontal plane A. Furthermore, the vehicle vibration apparatus according to the invention has a damping means 19 and a gas spring 20 which are arranged on the arms 17a, 17b of the scissor frame in such a way that vertical jolts are sprung and these springing actions can be damped accordingly.

Figure 3:
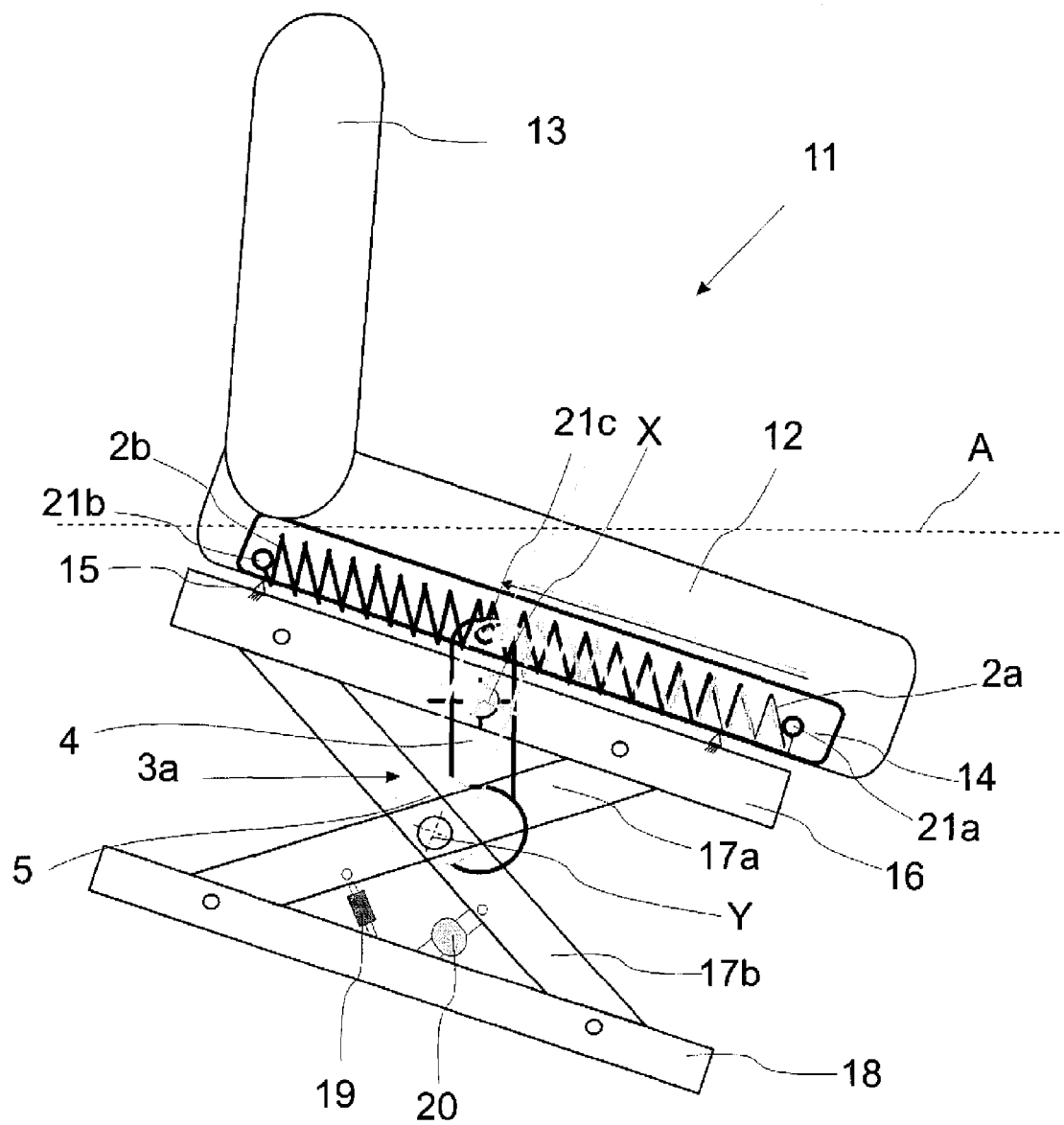
FIG. 3 is an schematic drawing of a seat with—arranged on it and as shown in FIG. 1a—a first embodiment of the vehicle vibration apparatus according to the invention with a horizontal springing apparatus and with a scissor frame in a position inclined with respect to the horizontal plane.

FIG. 3 is an schematic drawing of a seat 11 as shown in FIG. 2 in a position inclined with respect to the horizontal plane, on account of a drop for example. The seat 11 including the seat area 12 and the backrest 13 as well as the arrangement element 14 with the spiral springs 2a, 2b arranged in series are displaced in the direction of travel by the down-slope force which acts upon the seat 11. In addition, all three fastening points 21a, 21b, 21c can be displaced for a short time in the direction of travel, since the pendulum 3a can likewise be deflected for a short time out of its position of equilibrium. On account of the tendency of the pendulum 3a always to orientate itself in its position of equilibrium again, in which case the straight line which connects the centre point of the pendulum mass to the fulcrum X is orientated substantially at a right angle to the horizontal plane, a deflection of the pendulum 3a takes place in such a way that the adjustment element fastening point 21c moves in the direction opposed to the movement of the arrangement element 14. In the case of this movement the ends of the spiral springs 2a, 2b fastened to the pendulum 3a in the adjustment element fastening point 21c are entrained accordingly, as a result of which the first spiral spring 2a is stretched in its longitudinal spring direction and the second spiral spring 2b is compressed in its longitudinal spring direction. By means of these tensile and/or pressing forces additionally applied to the spiral springs the first spiral spring 2a which is possibly already stretched and which would be additionally stretched by means of a tensile force is retracted into the centre of its spring path in such a way that the first spring element fastening point 21a moves contrary to the movement of the arrangement element 14 and consequently carries along the arrangement element 14. At the same time the second spiral spring 2b which is possibly already in a compressed state on account of the movement of the arrangement element 14 is additionally acted upon with a pressing force, as a result of which the second spiral spring 2b undergoes a stretching on account of the spring force and consequently the second spring element fastening point 21b is moved contrary to the movement of the arrangement element 14 and thus entrains the arrangement element 14 in the direction of the starting position again.

As a result of this adjustment of the pendulum 3a into its position of equilibrium, by the so-called active slope compensation, the spring articulation and thus the acting spring pre-stressing are displaced, i.e. a positioning of the horizontal spring device in the centre of the spring path takes place, so that an equilibrium of the forces is present in the centre of the spring path, whereby an adequate spring path in both directions is available for following stimulations.

All the features disclosed in the application documents are claimed as being essential to the invention, insofar as they are novel either individually or in combination as compared with the prior art.

List of References
1a first embodiment
1b second embodiment
2 spring element
2a first spring element
2b second spring element
3a, 3b automatically reacting adjustment element
4 pendulum arm
5 pendulum mass
7 rotation-damping means
11 seat
12 seat element
13 backrest
14 arrangement element
15 loose bearing
16 support element
17a, 17b scissor arm
18 base element
19 damping means
20 gas spring
21a first spring element fastening point
21b second spring element fastening point
21c adjustment element fastening point
A horizontal plane
X fulcrum of the pendulum
Y point of intersection/fulcrum of the scissor arms

The invention claimed is:

1. A vehicle vibration apparatus with a horizontal spring device for the horizontal springing of a seat element or a driver's cab with respect to a base element, wherein the horizontal spring device is arranged between the seat element or the driver's cab respectively and the base element, characterized in that the horizontal spring device comprises at least one spring element, the longitudinal axis of which extends substantially parallel to a surface of the base element, and at least one adjustment element which reacts automatically to inclinations of the seat element with respect to a horizontal plane and which first increases a spring pre-stressing of the spring element by acting with an additional force on the spring element in the longitudinal direction of the extension of the spring in order subsequently to position the horizontal spring device in the center of the spring path, wherein the automatically reacting adjustment element is a pendulum which is mounted so as to be rotatable about a fulcrum.

2. A vehicle vibration apparatus according to claim 1, wherein the horizontal spring device is arranged in or on a driver's cab.

3. A vehicle vibration apparatus according to claim 1, wherein the horizontal spring device is arranged in or on a passenger seat.

4. A vehicle vibration apparatus according to claim 1, wherein a straight line which connects the center point of a pendulum mass and the fulcrum is orientated at a right angle to the horizontal plane in order to stress the spring element by means of the pendulum in the event of an inclination of the seat element with respect to the horizontal plane, in such a way that the horizontal spring device is guided back into the center of the spring path.

5. A vehicle vibration apparatus according to claim 4, wherein the pendulum is connected by its end facing away from the pendulum mass to an end of the spring element.

6. A vehicle vibration apparatus according to claim 4, wherein the fulcrum for mounting the pendulum is arranged in an arrangement element, wherein the spring element is arranged in or on the arrangement element.

7. A vehicle vibration apparatus according to claim 4, wherein the pendulum has a pendulum arm and the pendulum mass.

8. A vehicle vibration apparatus according to claim 7, wherein the pendulum arm of the pendulum is mounted in a rotatable manner on a support element in such a way that the pendulum mass can oscillate freely between the support element and the base element with respect to the support element.

9. A vehicle vibration apparatus according to claim 3, wherein at least one end of the spring element is connected to an arrangement element.

10. A vehicle vibration apparatus according to claim 1, wherein an arrangement element is arranged on a support element by way of at least two loose bearings so as to be movable in the longitudinal or transverse direction with respect to the longitudinal direction of the seat or driver's cab respectively.

11. A vehicle vibration apparatus according to claim 1, wherein the automatically reacting adjustment element is arranged on an inertial gear mechanism or a rotation-damping means in order to react with a delay to an inclination of the seat element.

12. A vehicle vibration apparatus according to claim 1, wherein the seat element is height adjustable with respect to the base element by means of a scissor frame and consequently it is arranged at a distance from the base element by means of the scissor frame.

* * * * *